United States Patent
Desai et al.

(10) Patent No.: US 12,441,692 B2
(45) Date of Patent: Oct. 14, 2025

(54) PROCESS FOR PREPARATION OF TRIAZOLE COMPOUND

(71) Applicant: UPL Limited, Mumbai (IN)

(72) Inventors: Jignesh Amrutlal Desai, Mumbai (IN); Digish Manubhai Panchal, Mumbai (IN)

(73) Assignee: UPL LIMITED, Mumbai (IN)

( * ) Notice: Subject to any disclaimer, the term of this patent is extended or adjusted under 35 U.S.C. 154(b) by 240 days.

(21) Appl. No.: 18/180,367

(22) Filed: Mar. 8, 2023

(65) Prior Publication Data
US 2023/0286926 A1    Sep. 14, 2023

(30) Foreign Application Priority Data
Mar. 9, 2022   (IN) .............................. 202221012818

(51) Int. Cl.
*C07D 249/08* (2006.01)
*C07D 301/02* (2006.01)
*C07D 303/08* (2006.01)

(52) U.S. Cl.
CPC ......... *C07D 249/08* (2013.01); *C07D 301/02* (2013.01); *C07D 303/08* (2013.01); *C07B 2200/13* (2013.01)

(58) Field of Classification Search
CPC .. C07D 249/08; C07D 303/08; C07D 301/02; C07B 2200/13; A01N 43/653; A01P 3/00
See application file for complete search history.

(56) References Cited

U.S. PATENT DOCUMENTS

| 4,664,696 A |   | 5/1987 | Schaub |
|---|---|---|---|
| 5,872,259 A | * | 2/1999 | Reuter ................. B01D 9/0036 548/267.8 |

(Continued)

FOREIGN PATENT DOCUMENTS

WO    WO-2021123935 A1  *  6/2021  ........... C07D 249/08

OTHER PUBLICATIONS

He et al., Analyst, 144, 5193 (Year: 2019).*
Camiletti et al., Powder Technology, 372, 455â465 (Year: 2020).*

*Primary Examiner* — Adam C Milligan
*Assistant Examiner* — Jason M. Nolan
(74) *Attorney, Agent, or Firm* — CANTOR COLBURN LLP

(57) ABSTRACT

Processes for preparation of a high purity cyproconazole, i.e., (2RS,3RS;2RS,3SR)-2-(4-chlorophenyl)-3-cyclopropyl-1-(1H-1,2,4-triazol-1-yl) butan-2-ol; and its compound i.e., 2-(4-chlorophenyl)-2-(1-cyclopropylethyl) oxirane generally includes reacting a ketone of formula (II) with a sulfonium salt in the presence of a base to obtain the oxirane compound of formula (III);

Formula (II)

(Continued)

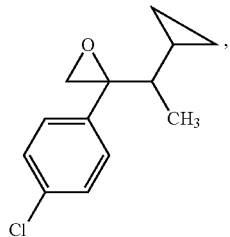

Formula (III)

wherein the sulfonium salt is obtained by reacting dimethyl sulfide and dimethyl sulfate in the presence of water; followed by reacting the oxirane compound of formula (III) with 1,2,4-triazole or its alkali metal salt to obtain a crude cyproconazole; and treating the crude cyproconazole with an aqueous alcohol to obtain a higher purity cyproconazole.

10 Claims, 1 Drawing Sheet

(56) References Cited

U.S. PATENT DOCUMENTS

2012/0077676 A1* 3/2012 Dietz ............... A61P 35/00
548/263.2
2022/0332691 A1* 10/2022 Grossmann .......... C07D 301/02

* cited by examiner

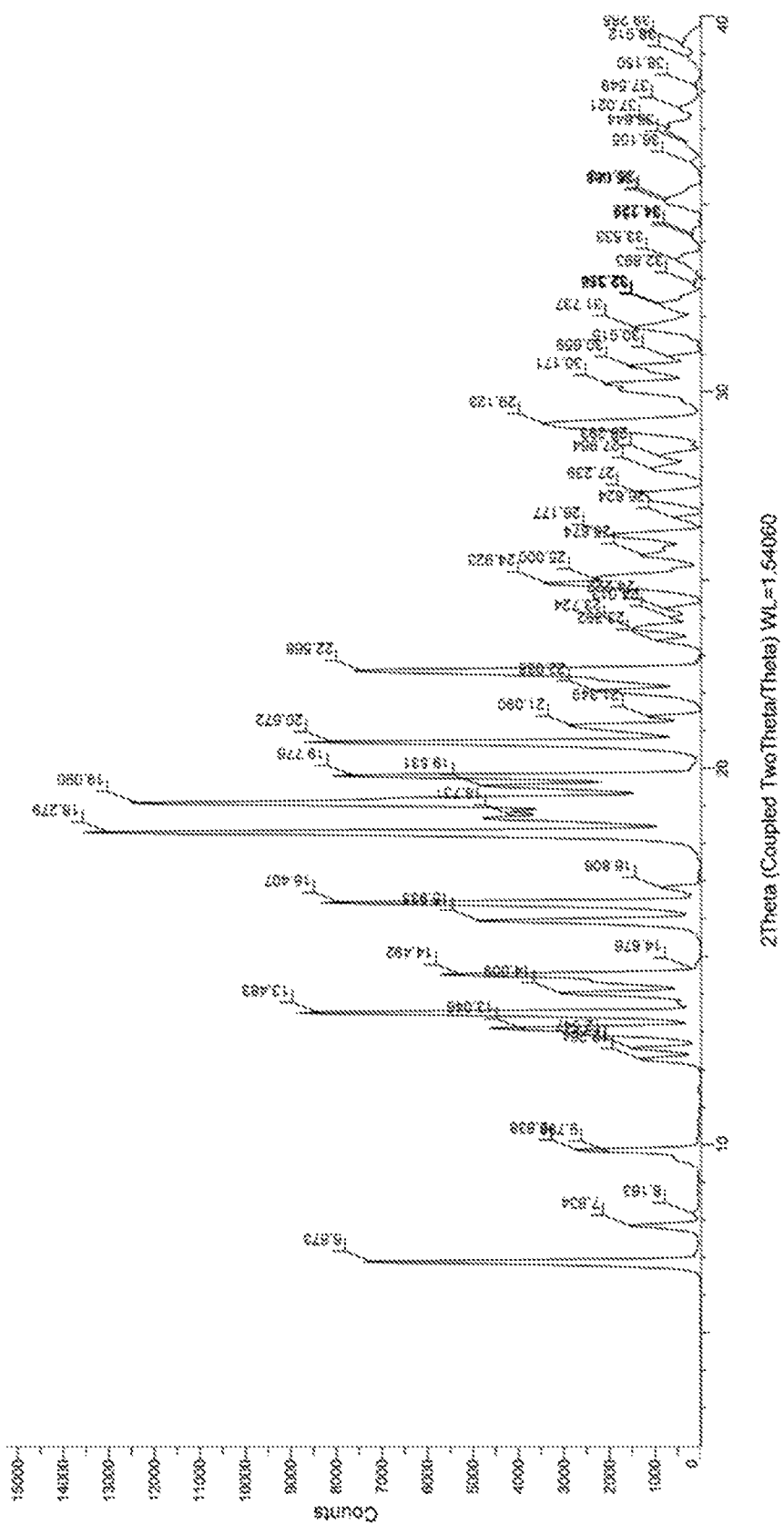

PROCESS FOR PREPARATION OF TRIAZOLE COMPOUND

CROSS-REFERENCE TO RELATED APPLICATIONS

This application claims priority to Indian Application 202221012818 filed on Mar. 9, 2022, which is incorporated herein by reference in its entirety.

FIELD OF THE DISCLOSURE

The present disclosure relates to an improved process for preparation of high purity cyproconazole.

BACKGROUND OF THE DISCLOSURE

Cyproconazole is a broad-spectrum fungicide for application in cereals and other field crops, to control *Septoria*, rust, powdery mildew and other diseases. Cyproconazole is chemically known as (2RS,3RS;2RS,3SR)-2-(4-chlorophenyl)-3-cyclopropyl-1-(1H-1,2,4-triazol-1-yl)butan-2-ol. It is represented by formula (I).

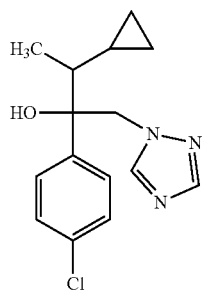

Formula (I)

Furthermore, cyproconazole as a compound was first disclosed in U.S. Pat. No. 4,664,696. U.S. patent publication 20120077676 discloses one of the processes for preparation of cyproconazole, wherein the process comprises two steps: step 1 involves preparation of a compound of formula (III), wherein a mixture of dimethyl sulfide and dimethyl sulfate in acetonitrile was prepared by stirring at room temperature for 16 hours, and to this mixture was then added a mixture of a ketone compound of formula (II) in dimethyl sulfoxide and powdered potassium hydroxide. This reaction mixture was stirred at room temperature for another 16 hours to complete the reaction. Later, water was added to reaction mixture and the product was extracted with ethyl acetate. After evaporating the solvent, the product was purified by column chromatography using 5% methyl tertiary-butyl ether (MTBE)/hexanes as an eluent to obtain 71% of compound of formula (III). In step 2, the compound of formula (III) obtained in step 1 is reacted with 1,2,4-triazole in presence of 4 equivalents of potassium carbonate and dimethyl formamide as solvent at 100-120° C. for 12 hours. After completion of reaction, the mixture is poured in cold water and then extracted with ethyl acetate. After evaporating the solvent, the product was purified by column chromatography to obtain the cyproconazole with 22% yield.

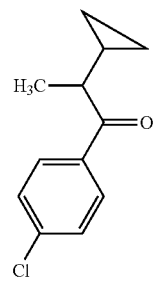

Formula (II)

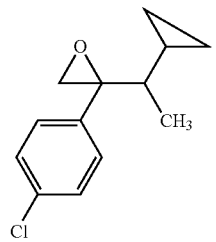

Formula (III)

However, this process has certain drawbacks such as:
use of multiple solvents for performing the reactions as well as for isolation of the product;
the highmole ratios of the reagents used;
desired products obtained with low yield;
use of tedious processes like column chromatography for purifying the compound as well as the final product; and
time consuming and lengthy process.

Furthermore, it is well known that during the manufacture of the cyproconazole, its undesired isomer is formed as one of the impurities. It is always desirable that the technical grade active ingredient should be relatively free from impurities. However, the use of column chromatography for purification at any stage makes the process less viable for large-scale production. Therefore, it is required to develop an improved and economical process for preparation of high purity cyproconazole of formula (I), in order to overcome the aforementioned drawbacks.

SUMMARY

It is a primary objective of the present disclosure to provide an improved and economical process for preparation of high purity cyproconazole of formula (I).

It is another objective of the present disclosure to provide a high purity compound of formula (III) formed during the process for preparation of cyproconazole of formula (I).

It is yet another objective of the present disclosure to provide cyproconazole of formula (I), which is substantially free from any undesired isomer(s).

It is another objective of the present disclosure to provide a process for preparation of high purity cyproconazole of formula (I) having high yield.

It is yet another objective of the present disclosure to provide a simple, cost-effective and industrially viable process for preparation of high purity cyproconazole of formula (I).

In one aspect, the present disclosure provides a process for preparation of high purity cyproconazole of formula (I), which is substantially free from any undesired isomer(s).

In another aspect, the present disclosure provides a process for purification of cyproconazole, wherein the process comprises treating crude cyproconazole with an aqueous alcohol.

In yet another aspect, the present disclosure provides a crystalline form of cyproconazole having bulk density from about 0.4 g/cc to about 0.8 g/cc.

In another aspect, the present disclosure provides a process for preparation of a compound of formula (III):

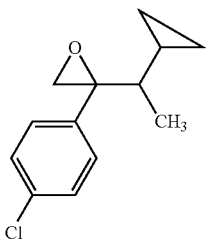

Formula (III)

the process comprising:
reacting a ketone compound of formula (II) with a sulfonium salt in the presence of a base in dimethyl sulfide to obtain the compound of formula (III);

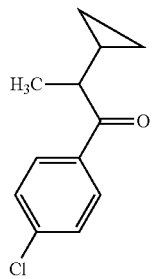

Formula (II)

wherein the sulfonium salt is obtained by reacting dimethyl sulfide and dimethyl sulfate in the presence of water.

In yet another aspect, the present disclosure provides a process for the preparation of high purity cyproconazole of formula (I):

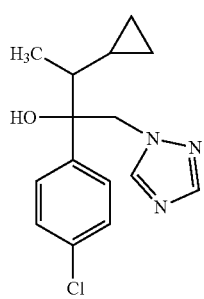

Formula (I)

the process comprising:
a) reacting a ketone compound of formula (II) with a sulfonium salt in the presence of a base in dimethyl sulfide to obtain a compound of formula (III);

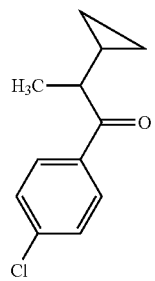

Formula (II)

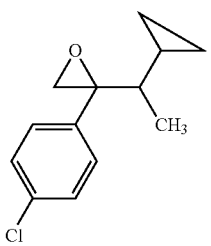

Formula (III)

wherein the sulfonium salt is obtained by reacting dimethyl sulfide and dimethyl sulfate in the presence of water;
b) reacting the compound of formula (III) with 1,2,4-triazole or its alkali metal salt to obtain crude cyproconazole; and
c) treating the crude cyproconazole with an aqueous alcohol to obtain the high purity cyproconazole of formula (I).

BRIEF DESCRIPTION OF DRAWING

FIG. 1 shows a powder X-ray diffraction (PXRD) of a crystalline form of the cyproconazole of formula (I).

DETAILED DESCRIPTION OF THE DISCLOSURE

The present disclosure now will be described hereinafter with reference to the accompanying examples, in which embodiments of the disclosure are shown. This description is not intended to be a detailed catalogue of all the different ways in which the disclosure may be implemented, or all the features that may be added to the instant disclosure. For example, features illustrated with respect to one embodiment may be incorporated into other embodiments, and features illustrated with respect to a particular embodiment may be deleted from that embodiment. Thus, the disclosure contemplates that in some embodiments of the disclosure, any feature or combination of features set forth herein can be excluded or omitted. In addition, numerous variations and additions to the various embodiments suggested herein will be apparent to those skilled in the art in light of the instant disclosure, which do not depart from the instant disclosure. Hence, the following descriptions are intended to illustrate some particular embodiments of the disclosure, and not to exhaustively specify all permutations, combinations and variations thereof.

Unless otherwise defined, all technical and scientific terms used herein have the same meaning as commonly understood by one of ordinary skill in the art to which this disclosure belongs. Although methods and materials similar or equivalent to those described herein can be used in the practice or testing of the disclosure, suitable methods and materials are described herein.

It must be noted that, as used in this specification, the singular forms "a", "an" and "the" include plural referents unless the content clearly dictates otherwise. The terms "preferred" and "preferably" refer to embodiments of the disclosure that may afford certain benefits, under certain circumstances.

As used herein, the terms "comprising", "including", "having", "containing", "involving", and the like are to be understood to be open-ended i.e., to mean including but not limited to.

As used herein, the terms "about" or "approximately" are inclusive of the stated value and means within an acceptable range of deviation for the particular value as determined by one of ordinary skill in the art, considering the measurement in question and the error associated with measurement of the particular quantity (i.e., the limitations of the measurement system). For example, "about" can mean within one or more standard deviations, or within ±10% or ±5% of the stated value.

Recitation of ranges of values are merely intended to serve as a shorthand method of referring individually to each separate value falling within the range, unless otherwise indicated herein, and each separate value is incorporated into the specification as if it were individually recited herein. The endpoints of all ranges are included within the range and independently combinable. As used herein, all numerical values or numerical ranges include integers within such ranges and fractions of the values or the integers within ranges unless the context clearly indicates otherwise. Thus, for example, reference to a range of 90-100%, includes 91%, 92%, 93%, 94%, 95%, 95%, 97%, etc., as well as 91.1%, 91.2%, 91.3%, 91.4%, 91.5%, etc., 92.1%, 92.2%, 92.3%, 92.4%, 92.5%, etc., and so forth. All methods described herein can be performed in a suitable order unless otherwise indicated herein or otherwise clearly contradicted by context.

The use of any and all examples, or exemplary language (e.g., "such as"), is intended merely to better illustrate the disclosure and does not pose a limitation on the scope of the disclosure unless otherwise claimed. No language in the specification should be construed as indicating any non-claimed element as essential to the practice of the disclosure as used herein.

While the disclosure has been described with reference to an exemplary embodiment, it will be understood by those skilled in the art that various changes may be made, and equivalents may be substituted for elements thereof without departing from the scope of the disclosure. In addition, many modifications may be made to adapt a particular situation or material to the teachings of the disclosure without departing from the essential scope thereof. Therefore, it is intended that the disclosure is not limited to the particular embodiment disclosed as the best mode contemplated for carrying out this disclosure, but that the disclosure will include all embodiments falling within the scope of the appended claims.

The expression of various quantities in terms of "%" or "% w/v" or "% w/w" means the percentage by weight of the total solution or composition unless otherwise specified.

As used herein, the term "agrochemical" is understood to denote an agricultural chemical such as pesticides, fungicides, insecticides, acaricides, herbicides, nematicides, plant growth regulators and can be used interchangeably.

As used herein, the term "fungicide" refers to the ability of a substance to decrease or inhibit growth of fungi or oomycetes.

As used herein, the term "fungicidally effective amount" is an amount of active ingredient such as a fungicide which causes an adversely modifying effect and includes deviations from natural development, killing, regulation, desiccation, retardation, and the like.

As used herein, the term "pre-emergence" refers to the time point before seedlings emerge from the ground. When any fungicide is applied at pre-emergence stage, it prevents establishment of the fungi.

As used herein, the term "post-emergence" refers to the time point after seedlings emerge from the ground. When any fungicide is applied at post-emergence stage, it prevents growth of the fungi.

As used herein, the term "plant" or "crop" refers to whole plants, plant organs (e.g., leaves, stems, twigs, roots, trunks, limbs, shoots, fruits etc.), plant cells, or plant seeds. This term also encompasses plant crops such as fruits. The term "plant" may further include the propagation material thereof, which may include all the generative parts of the plant such as seeds and vegetative plant material such as cuttings and tubers, which can be used for the multiplication of the plant. This includes seeds, tubers, spores, corms, bulbs, rhizomes, sprouts basal shoots, stolons, and buds and other parts of plants, including seedlings and young plants, which are to be transplanted after germination or after emergence from soil.

As used herein, the term "locus" as used herein shall denote the vicinity of a desired crop in which control of the spread of phytopathogenic fungi or fungi like pathogen is desired. The locus includes the vicinity of desired crop plants wherein the phytopathogenic fungi or fungi like pathogen infection has either emerged or is most likely to emerge or is yet to emerge.

As used herein, the term "plant propagation material" refers to the parts of the plant, such as seeds, which can be used for the propagation of the plant and vegetative plant material. There may be mentioned, e.g., the seeds (in the strict sense), roots, fruits, tubers, bulbs, rhizomes, parts of plants. Germinated plants or young plants, which may be transplanted after germination or after emergence from the soil.

As used herein, the term "seed" embraces seeds and plant propagules of all kinds including but not limited to true seeds, seed pieces, suckers, corms, bulbs, fruit, tubers, grains, cuttings, cut shoots and the like and means in a preferred embodiment true seed.

As used herein, the 'term "control" or "controlling" fungus means to inhibit, and/or suppress the ability of fungus to grow and/or reproduce, or to limit fungus-related damage or loss in crop plants or denotes control and prevention of a disease. Controlling effects include all deviation from natural development, for example: killing, retardation, decrease of the fungal disease.

As described herein, the term "high yield" of compound means that the yield of a product produced by a process is increased by a measurable amount over the yield of the same product produced under the same conditions by another process, but without the improvement in the process as described herein.

As used herein, the term "g a.i./L" as used herein denotes the concentration of the respective active ingredient in "grams" present "per litre" of the composition.

As used herein, the term "g a.i./h" as used herein denotes the concentration of the respective active ingredient in "grams" applied "per hectare" of the field.

As used herein, the term "tank mix" refers to a formulation of more than one component in a tank mix formulation and intended to be applied onto plants with/without further dilution with water to make a mixture.

As used herein, the term "pre-mix" refers to a formulation of more than one component in a ready-mix formulation and intended to be applied onto plants with/without further dilution with water to make a mixture.

As used herein, the term "room temperature" unless stated otherwise, essentially means temperature in a range from about 20 to about 35° C.

As used herein, the term "sulfonium salt" means trimethylsulfonium methyl sulfate salt obtained by reacting dimethyl sulfate with dimethyl sulfide.

As used herein, the term "purity" means purity as determined by High Pressure Liquid Chromatography (HPLC).

As used herein, the term "crude cyproconazole" used herein means the cyproconazole obtained by methods known to any person skilled in art, having low HPLC purity.

As used herein, the term "substantially free of undesired isomer(s)" means the cyproconazole having purity of more than 98% and comprising less than 2% undesired isomers.

Each of the aspects described above may have one or more embodiments. Each of the embodiments described hereinafter may apply to one or all of the aspects described hereinabove. These embodiments are intended to be read as being preferred features of one or all of the aspects described hereinabove. Each of the embodiments described hereinafter applies to each of the aspects described hereinabove individually.

According to an embodiment, the present disclosure provides a process for the purification of cyproconazole comprising treating cyproconazole with an aqueous alcohol.

In an embodiment, the present disclosure provides an improved and economical process for the preparation of high purity cyproconazole of formula (I):

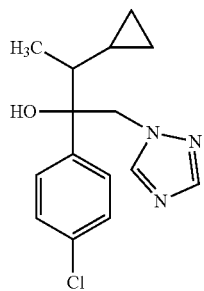

Formula (I)

In another embodiment, the present disclosure provides a process for the preparation of high purity cyproconazole of formula (I), i.e., (2RS,3RS;2RS,3SR)-2-(4-chlorophenyl)-3-cyclopropyl-1-(1H-1,2,4-triazol-1-yl)butan-2-ol.

According to an embodiment, the present disclosure provides a high purity cyproconazole of formula (I), substantially free from any undesired isomer(s).

In another embodiment, the present disclosure provides a cyproconazole of formula (I) having a purity of more than about 90%.

In another embodiment, the present disclosure provides a cyproconazole of formula (I) having a purity of more than about 92%.

In another embodiment, the present disclosure provides a cyproconazole of formula (I) having a purity of more than about 95%.

In another embodiment, the present disclosure provides a cyproconazole of formula (I) having a purity of more than about 98%, preferably more than about 99%.

In another embodiment, the present disclosure provides high purity cyproconazole of formula (I) having an undesired isomer in an amount of less than about 2%, preferably less than about 1%.

According to another embodiment, the present disclosure provides a process for purification of the cyproconazole, wherein the process comprises treating a crude cyproconazole with an aqueous alcohol.

In another embodiment, the crude cyproconazole is obtained by methods known to any person skilled in art.

In another embodiment, the aqueous alcohol comprises $C_1$ to $C_5$ alcohols such as methanol, ethanol, propanol, isopropanol, and combinations thereof.

In another embodiment, the alcohol is methanol.

In another embodiment, a weight ratio of water to alcohol in the aqueous alcohol is in a range from about 10:90 to about 90:10.

In an embodiment, the weight ratio of water to alcohol in the aqueous alcohol is selected from ratios comprising 10:90, 20:80, 30:70, 40:60, 50:50, 60:40, 70:30, 80:20 and 90:10.

In another embodiment, the weight ratio of water to alcohol in the aqueous alcohol is in the range from about 20:80 to about 80:20.

In another embodiment, the weight ratio of water to alcohol in the aqueous alcohol is in the range from about 30:70 to about 70:30.

In another embodiment, in the aqueous alcohol, the weight ratio of water to alcohol is 40:60.

In another embodiment, treating the crude cyproconazole with an aqueous alcohol comprises washing the crude cyproconazole with an aqueous alcohol.

In another embodiment, treating the crude cyproconazole with an aqueous alcohol comprises making a slurry of the crude cyproconazole with the aqueous alcohol and isolating purified cyproconazole from the slurry.

In yet another embodiment, treating the crude cyproconazole with an aqueous alcohol comprises dissolving the crude cyproconazole in the aqueous alcohol and recrystallizing the purified cyproconazole from the solution obtained.

According to another embodiment, the present disclosure provides a crystalline form of the cyproconazole.

In another embodiment, the present disclosure provides a crystalline form of cyproconazole characterised by an X-ray powder diffractogram using Cu-Kα radiation, wherein the cyproconazole displays at least three of the following reflections, quoted as 2θ±0.2° values 6.87, 7.83, 9.79, 9.83, 12.26, 12.54, 13.04, 13.48, 14.00, 14.49, 15.93, 16.40, 18.27, 18.73, 19.09, 19.53, 19.77, 20.67, 21.09, 22.03, 22.56, 23.72, 24.92, 25.00, 25.67, 26.17, 27.23, 27.96, 29.12, 30.17, 30.65 and 31.73.

In another embodiment, the present disclosure provides a crystalline form of a cyproconazole characterised by at least three reflections selected from 6.87, 7.83, 9.79, 9.83, 12.26, 12.54, 13.04, 13.48, 14.00, 14.49, 15.93, 16.40, 18.27, 18.73, 19.09, 19.53, 19.77, 20.67, 21.09, 22.03, 22.56, 23.72, 24.92, 25.00, 25.67, 26.17, 27.23, 27.96, 29.12, 30.17, 30.65 and 31.73 2θ±0.2°.

According to another embodiment, the present disclosure provides a crystalline form of the cyproconazole characterized by a powder X-ray diffraction (PXRD) pattern illustrated in FIG. 1.

In yet another embodiment, the present disclosure provides cyproconazole of formula (I) having a purity of more than about 98% and an undesired isomer of less than about 2%.

In yet another embodiment, the present disclosure provides a cyproconazole having bulk density from about 0.4 g/cc to about 0.8 g/cc.

In an embodiment of the present disclosure, high purity cyproconazole prepared according to the process of the present disclosure can be further characterised by parameters such as particle size distribution and the likes thereof.

According to another embodiment, the present disclosure provides a process for preparation of a compound of formula (III), i.e., 2-(4-chlorophenyl)-2-(1-cyclopropylethyl) oxirane.

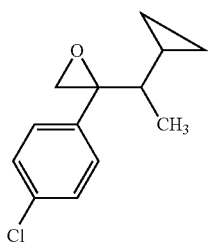

Formula (III)

In an embodiment, the present disclosure provides a process for preparation of a compound of formula (III):

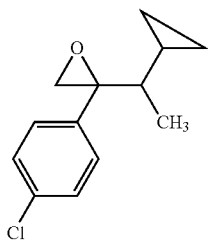

Formula (III)

the process comprising:
reacting a ketone compound of formula (II) with a sulfonium salt in the presence of a base;

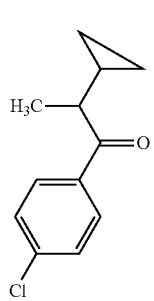

Formula (II)

wherein the sulfonium salt is prepared by reacting dimethyl sulfide and dimethyl sulfate in the presence of water.

In an embodiment, the present disclosure provides a process for the preparation of a compound of formula (III):

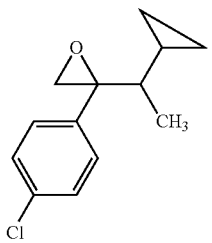

Formula (III)

the process comprising:
reacting a ketone compound of formula (II) with a sulfonium salt in the presence of a base and dimethyl sulfide at a temperature from about 35° C. to about 60° C.;

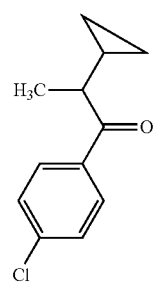

Formula (II)

wherein the sulfonium salt is prepared by reacting dimethyl sulfide and dimethyl sulfate in the presence of water at temperature from about 20° C. to about 40° C.

In an embodiment, the present disclosure provides a process for the preparation of a compound of formula (III):

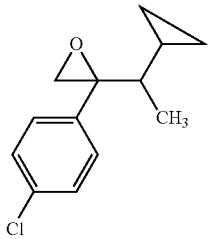

Formula (III)

the process comprising:
reacting a ketone compound of formula (II) with a sulfonium salt in the presence of a base in dimethyl sulfide to obtain the compound of formula (III);

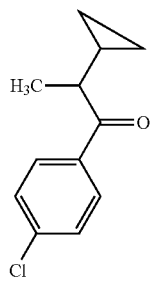

Formula (II)

wherein the sulfonium salt is prepared by reacting dimethyl sulfide and dimethyl sulfate in the presence of water.

In another embodiment, the compound of formula (II) is 1-(4-chlorophenyl)-2-cyclopropyl-1-propanone, wherein the compound of formula (II) may be prepared by methods known to any person skilled in the art.

In an embodiment, the base comprises an organic base or an inorganic base. Preferably, the base comprises an inorganic base.

Exemplary inorganic bases comprise alkali metal hydroxides such as sodium hydroxide, potassium hydroxide; alkali metal carbonates such as sodium carbonate, sodium bicarbonate, potassium carbonate, potassium bicarbonate; and combinations thereof.

In yet another embodiment, the amount of base used with respect to the ketone compound of formula (II) is in a range from about 2.5 to about 5 moles.

In an embodiment, the amount of dimethyl sulfide used for preparing sulfonium salt, with respect to the ketone compound of formula (II) is in a range from about 3.5 to about 7 moles.

In an embodiment, the amount of dimethyl sulfide used for preparing sulfonium salt, with respect to the ketone compound of formula (II) is preferably in a range from about 4 to about 6.5 moles.

In an embodiment, the amount of dimethyl sulfate used for preparing sulfonium salt, with respect to the ketone compound of formula (II) is in a range from about 0.5 moles to about 2 moles.

In an embodiment, the amount of water used with respect to the ketone compound of formula (II) is in a range from about 0.5 moles to about 2 moles.

According to an embodiment, the present disclosure provides a process for the preparation of high purity cyproconazole of formula (I):

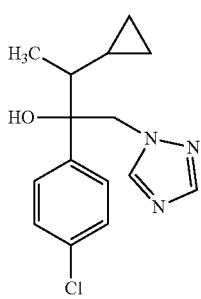

Formula (I)

the process comprising:
a) reacting a ketone compound of formula (II) with a sulfonium salt in the presence of a base in dimethyl sulfide to obtain a compound of formula (III);

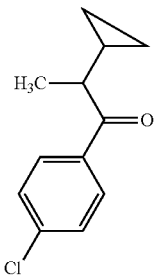

Formula (II)

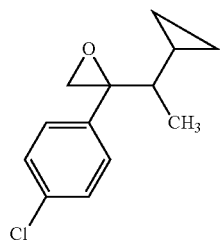

Formula (III)

wherein the sulfonium salt used is obtained by reacting dimethyl sulfide and dimethyl sulfate in the presence of water;
b) reacting the compound of formula (III) with 1,2,4-triazole or its alkali metal salt to obtain crude cyproconazole; and
c) treating the crude cyproconazole with an aqueous alcohol to obtain the high purity cyproconazole of formula (I).

In an embodiment, the alkali metal salt of 1,2,4-triazole is prepared in situ, by reacting 1,2,4-triazole with an alkali metal base. The alkali metal base is selected from alkali metal hydroxides, carbonates, and bicarbonates.

In an embodiment, the compound of formula (III) is prepared by reacting a premix solution of sulfonium salt (comprising dimethyl sulfide and dimethyl sulfate in water), with a solution comprising a ketone compound of formula (II) in the presence of a base in dimethyl sulfide.

According to an embodiment, the premix solution of sulfonium salt comprising dimethyl sulfide and dimethyl sulfate in the presence of water is prepared at a temperature range from about 10° C. to about 60° C.

In another embodiment, the premix solution of sulfonium salt comprising dimethyl sulfide and dimethyl sulfate in the presence of water is prepared at a temperature range from about 20° C. to about 40° C.

In another embodiment, the premix solution of sulfonium salt is reacted with a solution comprising the ketone compound of formula (II) by adding the premix solution of sulfonium salt to the solution comprising the ketone compound of formula (II) or by adding the solution comprising the ketone compound of formula (II) to the premix solution of sulfonium salt.

In another embodiment, the compound of formula (III) is prepared by reacting the sulfonium salt with the ketone compound of formula (II) in presence of a base in dimethyl sulfide, wherein the sulfonium salt is prepared in situ by reacting dimethyl sulfide and dimethyl sulfate in the presence of water.

According to an embodiment, the process for preparation of the compound of formula (III) is carried out at a temperature ranging from about 20° C. to about 80° C.

In an embodiment, the process for preparation of the compound of formula (III) is carried out at a temperature ranging from about 25° C. to about 70° C.

In an embodiment, the process for preparation of the compound of formula (III) is carried out at a temperature ranging from about 35° C. to about 60° C.

According to an embodiment, the process for preparation of the compound of formula (III) is carried out at a temperature ranging from 35° C. to 60° C. for a period of time from about 4 to about 16 hours.

In an embodiment, the process for preparation of the compound of formula (III) is carried out at a temperature ranging from 35° C. to 60° C. for a time period from about 8 to about 12 hours.

According to an embodiment, the process for preparation of the compound of formula (III) is carried out in the presence of an additional solvent.

In an embodiment, after completion of reaction of the sulfonium salt with the ketone compound of formula (II), an excess of dimethyl sulphide is recovered to obtain a reaction mass. The reaction mass obtained is further treated with water and an organic solvent to obtain the compound of formula (III).

In an embodiment, the additional solvent comprises an inert solvent.

In an embodiment, the additional solvent comprises an inert organic solvent.

In an embodiment, the inert organic solvent comprises an aliphatic hydrocarbon or an aromatic hydrocarbon such as hexane, heptane, and combinations thereof.

In another embodiment, the compound of formula (III) obtained has a purity of more than 98%.

According to an embodiment, the present disclosure provides a process for the preparation of a compound of formula (III):

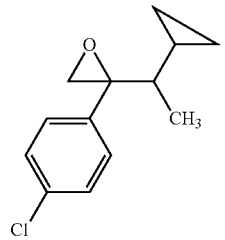

Formula (III)

the process comprising:
reacting a ketone compound of formula (II) with a sulfonium salt in presence of a base in dimethyl sulfide at a temperature ranging from about 35° C. to about 60° C.;

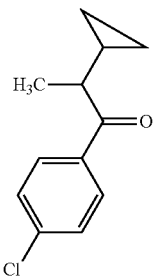

Formula (II)

wherein the sulfonium salt used is obtained by reacting dimethyl sulfide and dimethyl sulfate in the presence of water at a temperature ranging from about 20° C. to about 40° C.

According to yet another embodiment, the present disclosure provides a process for the preparation of high purity cyproconazole of formula (I):

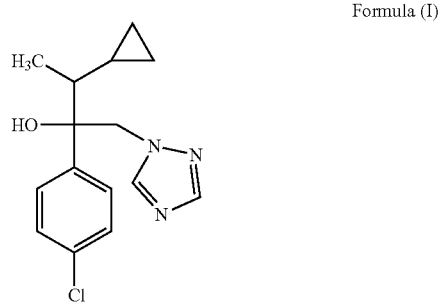 [SMILES: CC(C1CC1)C(O)(Cn1cncn1)c1ccc(Cl)cc1]

Formula (I)

the process comprising:
a) reacting a ketone compound of formula (II) with a sulfonium salt in the presence of a base in dimethyl sulfide at a temperature ranging from about 35° C. to about 60° C., to obtain an compound of formula (III);

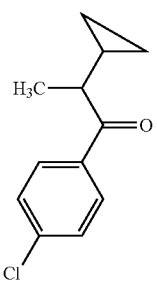

Formula (II)

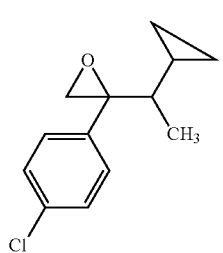

Formula (III)

wherein the sulfonium salt used is obtained by reacting dimethyl sulfide and dimethyl sulfate in the presence of water at a temperature ranging from about 20° C. to about 40° C.;
b) reacting the compound of formula (III) with 1,2,4-triazole or its alkali metal salt to obtain a crude cyproconazole; and
c) treating the crude cyproconazole with an aqueous alcohol to obtain the high purity cyproconazole of formula (I).

According to an embodiment, the process for the preparation of cyproconazole according to the process of the present disclosure is illustrated by Scheme I:

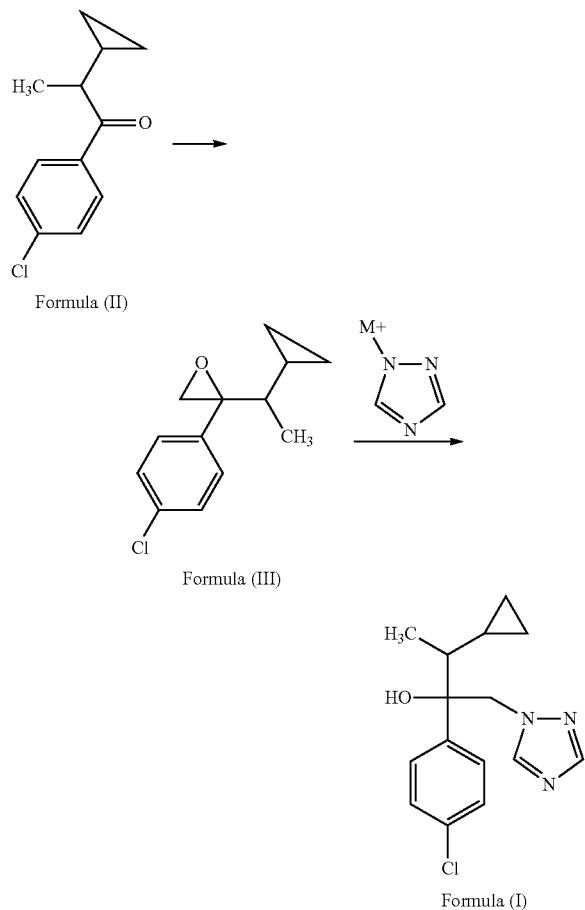

Scheme I

Formula (II)

Formula (III)

Formula (I)

In an embodiment, the present invention provides a process for the preparation of cyproconazole, wherein the process proceeds via the compound of formula III.

In an embodiment, the present invention provides a process for the preparation of cyproconazole, wherein the process starts from the compound of formula II and proceeds via the compound of formula III.

In an embodiment, in step b) the compound of formula (III) is reacted with 1,2,4-triazole or its alkali metal salt to obtain crude cyproconazole.

In another embodiment, step b) comprises an alkali metal salt of 1,2,4-triazole.

In another embodiment, the alkali metal salt of 1,2,4-triazole used in step b) is prepared in situ by reacting 1,2,4-triazole with an alkali metal base.

In another embodiment, the alkali metal base comprises alkali metal hydroxides, carbonates, bicarbonates, and combinations thereof. The alkali metal base can comprise alkali metal hydroxides such as sodium hydroxide, potassium hydroxide; alkali metal carbonates such as sodium carbonate, sodium bicarbonate, potassium carbonate, potassium bicarbonate, and combinations thereof.

In yet another embodiment, the alkali metal base preferably comprises alkali metal carbonates, bicarbonates, and combinations thereof.

In yet another embodiment, the alkali metal salt of 1,2,4-triazole used in step b) is prepared separately and then reacted with the compound of formula (III).

In an embodiment, in step b) the reaction of the compound of formula (III) and 1,2,4-triazole or its alkali metal salt is carried out in the presence of a polar solvent.

In another embodiment, the polar solvent comprises dimethylformamide, N,N-dimethylacetamide, N-methylpyrrolidone, dimethylsulfoxide, and combinations thereof.

In another embodiment, in step b) the alkali metal salt of 1,2,4-triazole used is prepared by treating 1,2,4-triazole with an alkali metal base such as sodium hydroxide, sodium carbonate, sodium bicarbonate, potassium hydroxide, potassium carbonate, potassium bicarbonate, or combinations thereof, in the presence of a polar solvent, and optionally, in the presence of an aromatic hydrocarbon.

In yet another embodiment, the aromatic hydrocarbon comprises toluene.

In yet another embodiment, the amount of alkali metal base used for the preparation of the alkali metal salt of 1,2,4-triazole, with respect to the compound of formula (III), is in a range from about 0.1 to about 0.5 moles.

According to another embodiment, in step b) the alkali metal salt of 1,2,4-triazole is prepared in situ in the process.

In another embodiment, in step b) the alkali metal salt of 1,2,4-triazole is prepared separately and then reacted with the compound of formula (III).

According to an embodiment, further in step b) after completion of reaction, the polar solvent is distilled off, and the crude cyproconazole is treated with water and/or an organic solvent.

In another embodiment, the organic solvent comprises an aromatic hydrocarbon such as toluene or an aliphatic hydrocarbon such as hexane.

In another embodiment, the crude cyproconazole is treated with water.

In another embodiment, the crude cyproconazole is treated with an aromatic hydrocarbon such as toluene.

In another embodiment, the crude cyproconazole is treated with an aliphatic hydrocarbon such as hexane.

According to another embodiment, in step c) the crude cyproconazole is treated with an aqueous alcohol to obtain high purity cyproconazole of formula (I).

In another embodiment, the aqueous alcohol comprises $C_1$ to $C_5$ alcohols such as methanol, ethanol, propanol, isopropanol, and combinations thereof.

In another embodiment, the aqueous alcohol preferably is methanol.

According to another embodiment, in step c) the weight ratio of water to alcohol in the aqueous alcohol is in a range from about 10:90 to about 90:10.

In an embodiment, the weight ratio of water to alcohol in the aqueous alcohol is selected from ratios comprising 10:90, 20:80, 30:70, 40:60, 50:50, 60:40, 70:30, 80:20 and 90:10.

In another embodiment, the weight ratio of water to alcohol in the aqueous alcohol is in the range from about 20:80 to about 80:20.

In another embodiment, the weight ratio of water to alcohol in the aqueous alcohol is in the range from about 30:70 to about 70:30.

In another embodiment, in the aqueous alcohol, the weight ratio of water to alcohol is 40:60.

In an embodiment, step c) comprises treating the crude cyproconazole by washing the crude cyproconazole with an aqueous alcohol.

In another embodiment, step c) comprises making a slurry of the crude cyproconazole with an aqueous alcohol and isolating purified cyproconazole.

In yet another embodiment, step c) comprises dissolving the crude cyproconazole in the aqueous alcohol and recrystallizing the purified cyproconazole compound from the solution obtained.

According to an embodiment, the present disclosure provides a process for the preparation of high purity cyproconazole of formula (I):

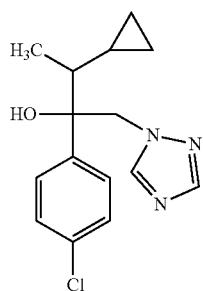

Formula (I)

the process comprising:
a) reacting a ketone compound of formula (II) with a sulfonium salt in the presence of a base in dimethyl sulfide at a temperature ranging from about 35° C. to about 60° C. to obtain an compound of formula (III);

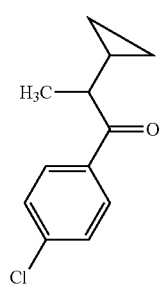

Formula (II)

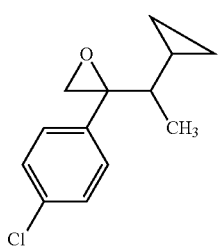

Formula (III)

wherein the sulfonium salt used is obtained by reacting dimethyl sulfide and dimethyl sulfate in the presence of water;
b) reacting the compound of formula (III) with 1,2,4-triazole or its alkali metal salt to obtain a crude cyproconazole; and
c) treating the crude cyproconazole with an aqueous alcohol to obtain the high purity cyproconazole of formula (I).

In an embodiment, the present disclosure provides the use of the high purity cyproconazole of formula (I) as a fungicide for controlling the growth of fungal phytopathogens, wherein the cyproconazole of formula (I) is prepared by a process comprising:
a) reacting a ketone compound of formula (II) with a sulfonium salt in the presence of a base in dimethyl sulfide to obtain a compound of formula (III);

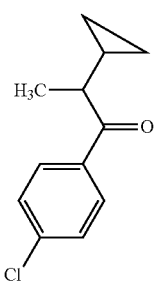

Formula (II)

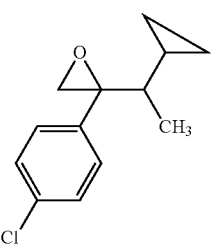

Formula (III)

wherein the sulfonium salt used is obtained by reacting dimethyl sulfide and dimethyl sulfate in the presence of water at temperature ranging from about 20° C. to about 40° C.;
b) reacting the compound of formula (III) with 1,2,4-triazole or its alkali metal salt to obtain a crude cyproconazole; and
c) treating the crude cyproconazole with an aqueous alcohol to obtain the high purity cyproconazole of formula (I).

According to an embodiment, the present disclosure provides the use of the cyproconazole of formula (I) as a fungicide for controlling the growth of fungal phytopathogens.

In an embodiment, the present disclosure provides the use of the high purity cyproconazole of formula (I) as a fungicide for controlling the growth of fungal phytopathogens.

In an embodiment, the present disclosure provides the use of the high purity cyproconazole of formula (I) as a fungicide for controlling the growth of fungal phytopathogens, wherein the cyproconazole of formula (I) is prepared by a process comprising:
a) reacting a ketone compound of formula (II) with a sulfonium salt in the presence of a base in dimethyl sulfide at a temperature ranging from about 35° C. to about 60° C. to obtain a compound of formula (III);

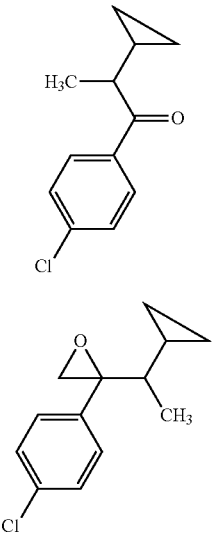

Formula (II)

Formula (III)

wherein the sulfonium salt is obtained by reacting dimethyl sulfide and dimethyl sulfate in the presence of water at temperature ranging from about 20° C. to about 40° C.;

b) reacting the compound of formula (III) with 1,2,4-triazole or its alkali metal salt to obtain a crude cyproconazole; and treating the crude cyproconazole with an aqueous alcohol to obtain the high purity cyproconazole of formula (I).

In an embodiment, the cyproconazole of formula (I) of the present disclosure may be applied before or after infection of the plants by the fungal phytopathogens, to the plant, or a locus, or a plant propagation material thereof.

In another embodiment, the cyproconazole of formula (I) of the present disclosure may be used as a foliar application, application to a ground, or to a plant, or a locus, or a plant propagation material, and combinations thereof.

In an embodiment, the present disclosure provides use of the high purity cyproconazole of formula (I) as a fungicide for controlling the growth of powdery mildew disease in plants.

In an embodiment, the present disclosure provides use of the high purity cyproconazole of formula (I) as a fungicide for controlling the growth of powdery mildew disease in grapes.

According to an embodiment, the target crop may include cereals such as wheat, barley, rye, oats, corn, rice, sorghum, triticale and related crops; beets such as sugar beet and fodder beet; leguminous plants such as beans, lentils, peas, soybean, chickpeas; dry bean, dry pea, rye, triticale, oat, wheat, barley, oil plants such as rape, mustard, sunflowers; cucurbits such as marrows, cucumbers, melons; fibre plants such as cotton, flax, hemp, jute; vegetables such spinach, lettuce, asparagus, cabbages, carrots, onions, tomatoes, potatoes, paprika as well as ornamentals such as flowers, shrubs, broad-leaved trees and evergreens, such as conifers.

According to an embodiment, the cyproconazole of formula (I) of the present disclosure can be used to control fungal diseases, for example pea diseases caused by one or more species of: *Alternaria alternata, Aphanomyces euteiches* f. sp. *pisi, Ascochyta pinodella, Ascochyta pinodes, Ascochyta pisi, Botryotinia fuckeliana, Botrytis cinerea, Cercospora pisa-sativae, Chalara elegans, Cladosporium cladosporioides* f. sp. *pisicoia, Cladosporium pisicoia, Colletotrichum gloeosporioides, Colletotrichum pisi, Erysiphe pisi, Fusarium oxysporum, Fusarium oxysporum.* sp. *pisi, Fusarium solani, Fusicladium pisicoia, Glomerella cingulata, Mycosphaerella pinodes, Oidium* sp., *Peronospora viciae, Phoma pinodella, Pythium* spp., *Rhizoctonia solani, Sclerotinia sclerotiorum, Septoria pisi, Thanatephonis cucurneris, Thielaviopsis hasicola* and *Uromyces fabae*, Soybean diseases: *Cercospora kikuchii, Elsinoe glycines, Diaporthe phaseolorum* var. *sojae, Septoria glycines, Cercospora sojina, Phakopsora pachyrhizi, Phytophthora sojae Rhizoctonia solani*, and combinations thereof.

In a preferred embodiment, the cyproconazole of formula (I) may be used to control a broad spectrum of plant diseases, such as:

Disease in rice: Blast (*Magnaporthe grisea*), Helminthosporium leaf spot (*Cochliobolus miyabeanus*), sheath blight (*Rhizoctonia solani*), and bakanae disease (*Gibberella fujikuroi*).

Diseases in wheat: powdery mildew (*Erysiphe graminis*), Fusariuin head blight (*Fusarium graminearum, F. avenacerum, F. culmorum, Microdochium nivale*), rust (*Puccinia striiformis, P. graminis, P. recondita*), pink snow mold (*Micronectriella nivale*), Typhula snow blight (*Typhula* sp.), loose smut (*Ustilago tritici*), bunt (*Tilletia caries*), eyespot (*Pseudocercosporella herpotrichoides*), leaf blotch (*Mycosphaerella graminicola*), glume blotch (*Stagonospora nodorum*), septoria, and yellow spot (*Pyrenophora tritici-repentis*).

Diseases in barley: powdery mildew (*Erysiphe graminis*), Fusarium head blight (*Fusarium graminearum, F. avenacerum, F. culmorum, Microdochium nivale*), rust (*Puccinia striiformis, P. graminis, P. hordei*), loose smut (*Ustilago nuda*), scald (*Rhynchosporium secalis*), net blotch (*Pyrenophora teres*), spot blotch (*Cochliobolus sativus*), leaf stripe (*Pyrenophora graminea*), and *Rhizoctonia* damping-off (*Rhizoctonia solani*).

Diseases in corn: smut (*Ustilago maydis*), brown spot (*Cochliobolus heterostrophus*), copper spot (*Gloeocercospora sorghi*), southern rust (*Puccinia polysora*), gray leaf spot (*Cercospora zeae-maydis*), white spot (*Phaeosphaeria mydis* and/or *Pantoea ananatis*) and *Rhizoctonia* damping-off (*Rhizoctonia solani*).

Diseases in citrus: melanose (*Diaporthe citri*), scab (*Elsinoe fawcetti*), Penicillium rot (*Penicillium digitatum, P. italicum*), and brown rot (*Phytophthora parasitica, Phytophthora citrophthora*).

Diseases in apple: blossom blight (*Monilinia mali*), canker (*Valsa ceratosperma*), powdery mildew (*Podosphaera leucotricha*), Alternaria leaf spot (*Alternaria alternata* apple pathotype), scab (*Venturia inaequalis*), powdery mildew, bitter rot (*Colletotrichum acutatum*), crown rot (*Phytophthora cactorum*), blotch (*Diplocarpon mali*), and ring rot (*Botryosphaeria berengeriana*).

Diseases in pear: scab (*Venturia nashicola, V. pirina*), powdery mildew, black spot (*Alternaria alternata* Japanese pear pathotype), rust (*Gymnosporangium haraeanum*), and *phytophthora* fruit rot (*Phytophthora cactorum*).

Diseases in peach: brown rot (*Monilinia fructicola*), powdery mildew, scab (*Cladosporium carpophilum*), and *phomopsis* rot (*Phomopsis* sp.).

Diseases in grape: anthracnose (*Elsinoe ampelina*), ripe rot (*Glomerella cingulata*), powdery mildew (*Uncinula* necator), rust (*Phakopsora ampelopsidis*), black rot (*Guignardia bidwellii*), botrytis, and downy mildew (*Plasmopara viticola*).

Diseases in Japanese persimmon: anthracnose (*Gloeosporium kaki*), and leaf spot (*Cercospora kaki, Mycosphaerella nawae*).

Diseases in gourd: anthracnose (*Colletotrichum lagenarium*), powdery mildew (*Sphaerotheca fuliginea*), gummy stem blight (*Mycosphaerella melonis*), Fusarium wilt (*Fusarium oxysporum*), downy mildew (*Pseudoperonospora cubensis*), Phytophthora rot (*Phytophthora* sp.), and damping-off (*Pythium* sp.).

Diseases in tomato: early blight (*Alternaria solani*), leaf mold (*Cladosporium fulvum*), and late blight (*Phytophthora infestans*).

Diseases in eggplant: brown spot (*Phomopsis vexans*), and powdery mildew (*Erysiphe cichoracearum*) Diseases of cruciferous vegetables: *Alternaria* leaf spot (*Alternaria japonica*), white spot (*Cercosporella brassicae*), clubroot (*Plasmodiophora brassicae*), and downy mildew (*Peronospora parasitica*).

Diseases in onion: rust (*Puccinia allii*), and downy mildew (*Peronospora destructor*). Diseases in soybean: purple seed stain (*Cercospora kikuchii*), sphaceloma scad (*Elsinoe glycines*), pod and stem blight (*Diaporthe phaseolorum* var. *sojae*), septoria brown spot (*Septoria glycines*), frogeye leaf spot (*Cercospora sojina*), rust (*Phakopsora pachyrhizi*), Yellow rust, brown stem rot (*Phytophthora sojae*), and *Rhizoctonia* damping-off (*Rhizoctonia solani*).

Diseases in kidney bean: anthracnose (*Colletotrichum lindemthianum*). Diseases of peanut: leaf spot (*Cercospora personata*), brown leaf spot (*Cercospora arachidicola*) and southern blight (*Sclerotium rolfsii*).

Diseases in garden pea: powdery mildew (*Erysiphe pisi*), and root rot (*Fusarium solani* f. sp. *pisi*).

Diseases in potato: early blight (*Alternaria solani*), late blight (*Phytophthora infestans*), pink rot (*Phytophthora erythroseptica*), and powdery scab (*Spongospora subterranean* f. sp. *subterranea*).

Diseases in strawberry: powdery mildew (*Sphaerotheca humuli*), and anthracnose (*Glomerella cingulata*).

Diseases in tea: net blister blight (*Exobasidium reticulatum*), white scab (*Elsinoe leucospila*), gray blight (*Pestalotiopsis* sp.), and anthracnose (*Colletotrichum theae-sinensis*).

Diseases in tobacco: brown spot (*Alternaria longipes*), powdery mildew (*Erysiphe cichoracearum*), anthracnose (*Colletotrichum tabacum*), downy mildew (*Peronospora tabacina*), and black shank (*Phytophthora nicotianae*).

Diseases in rapeseed: *sclerotinia* rot (*Sclerotinia sclerotiorum*), and *Rhizoctonia* damping-off (*Rhizoctonia solani*). Diseases of cotton: *Rhizoctonia* damping-off (*Rhizoctonia solani*).

Diseases in sugar beet: *Cercospora* leaf spot (*Cercospora beticola*), leaf blight (*Thanatephorus cucumeris*), Root rot (*Thanatephorus cucumeris*), and *Aphanomyces* root rot (*Aphanomyces cochlioides*).

Diseases in rose: black spot (*Diplocarpon rosae*), powdery mildew (*Sphaerotheca pannosa*), and downy mildew (*Peronospora sparsa*), Diseases of *chrysanthemum* and asteraceous plants: downy mildew (*Bremia lactucae*), leaf blight (*Septoria chrysanthemi-indici*), and white rust (*Puccinia horiana*).

Diseases in various groups: diseases caused by *Pythium* spp. (*Pythium aphanidermatum, Pythium debarianum, Pythium graminicola, Pythium irregulare, Pythium ultimum*), gray mold. (*Botrytis cinerea*), and *Sclerotinia* rot (*Sclerotinia sclerotiorum*).

Disease in Japanese radish: *Alternaria* leaf spot (*Alternaria brassicicola*).

Diseases in turfgrass: dollar spot (*Sclerotinia homeocarpa*), and brown patch and large patch (*Rhizoctonia solani*).

Disease in banana: Black sigatoka (*Mycosphaerella fijiensis*), Yellow sigatoka (*Mycosphaerella musicola*).

Disease in sunflower: downy mildew (*Plasmopara halstedii*).

In another embodiment, the seed diseases or diseases in the early stages of the growth of various plants caused by *Aspergillus* spp., *Penicillium* spp., *Fusarium* spp., *Gibberella* spp., *Tricoderma* spp., *Thielaviopsis* spp., *Rhizopus* spp., *Mucor* spp., *Corticium* spp., *Phoma* spp., *Rhizoctonia* spp. and *Diplodia* spp. Additionally, viral diseases of various plants mediated by *Polymxa* spp. or *Olpidium* spp. and the like.

According to an embodiment, the present disclosure provides a method for controlling the growth of fungal phytopathogens, the method comprising applying to a plant, or a locus, or a plant propagation material thereof, an effective amount of the cyproconazole of formula (I).

According to an embodiment, the present disclosure provides a method for controlling the growth of fungal phytopathogens, the method comprising applying to a plant, or a locus, or a plant propagation material thereof, an effective amount of high purity cyproconazole of formula (I).

According to an embodiment, the present disclosure provides a method for controlling the growth of fungal phytopathogens, the method comprising applying to a plant, or a locus, or a plant propagation material thereof, an effective amount of high purity cyproconazole of formula (I) prepared by the process comprising:

a) reacting a ketone compound of formula (II) with a sulfonium salt in the presence of a base in dimethyl sulfide to obtain a compound of formula (III);

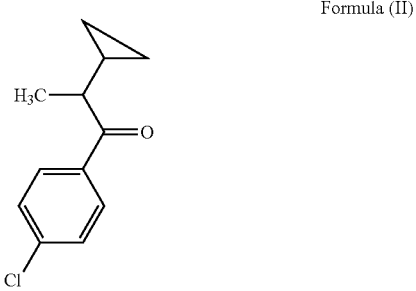

Formula (II)

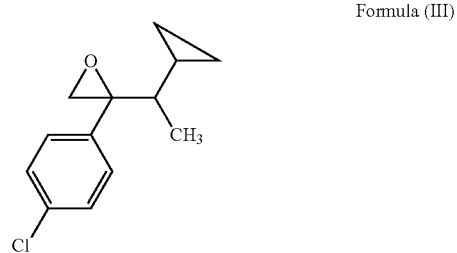

Formula (III)

wherein the sulfonium salt is obtained by reacting dimethyl sulfide and dimethyl sulfate in the presence of water;

b) reacting the compound of formula (III) with 1,2,4-triazole or its alkali metal salt to obtain a crude cyproconazole; and c) treating the crude cyproconazole with an aqueous alcohol to obtain the high purity cyproconazole of formula (I).

According to an embodiment, the present disclosure provides a method for controlling the growth of fungal phytopathogens, the method comprising applying to a plant, or a locus, or a plant propagation material thereof, an effective amount of high purity cyproconazole of formula (I) prepared by the process comprising:

a) reacting a ketone compound of formula (II) with a sulfonium salt in the presence of a base in dimethyl sulfide at a temperature ranging from about 35° C. to about 60° C. to obtain a compound of formula (III);

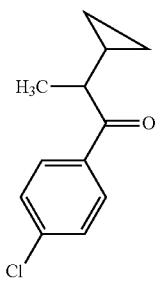

Formula (II)

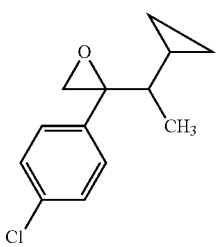

Formula (III)

wherein the sulfonium salt is obtained by reacting dimethyl sulfide and dimethyl sulfate in the presence of water at temperature ranging from about 20° C. to about 40° C.;

b) reacting the compound of formula (III) with 1,2,4-triazole or its alkali metal salt to obtain a crude cyproconazole; and c) treating the crude cyproconazole with an aqueous alcohol to obtain the high purity cyproconazole of formula (I).

According to an embodiment, the present disclosure provides a method for controlling the growth of fungal phytopathogens, wherein the cyproconazole of formula (I) is applied in a range from about 1 g a.i./ha to about 100 g a.i./ha.

In an embodiment, the present disclosure provides a method for controlling the growth of fungal phytopathogens, wherein the cyproconazole of formula (I) is applied in a range from about 1 g a.i./ha to about 70 g a.i./ha.

In an embodiment, the present disclosure provides a method for controlling the growth of fungal phytopathogens, wherein the cyproconazole of formula (I) is applied in a range from about 1 g a.i./ha to about 50 g a.i./ha.

In an embodiment, the present disclosure provides a method for controlling the growth of fungal phytopathogens, wherein the cyproconazole of formula (I) is applied in a range from about 1 g a.i./ha to about 30 g a.i./ha.

In an embodiment, the present disclosure provides a method for controlling the growth of fungal phytopathogens, wherein the cyproconazole of formula (I) is applied in a range of about 15 g a.i./ha.

According to an embodiment, the cyproconazole of formula (I) prepared by a process of the present disclosure may be used to prepare a fungicidal composition selected from powder for dry soil application (DS), dry flowable (DF), granule/soil applied (GR), Controlled (slow or fast) release granules (CR), jambo balls or bags (bags in water soluble pouch), water soluble granule (SG), water dispersible granule (WG or WDG), soil applied granules (SAG), and combinations thereof.

In an embodiment, the cyproconazole of formula (I) prepared by a process of the present disclosure may be used to prepare a fungicidal composition in a form of a dry flowable (DF).

In an embodiment, the cyproconazole of formula (I) prepared by a process of the present disclosure may be used to prepare a fungicidal composition in a form of a water dispersible granule (WG or WDG).

According to an embodiment, a fungicidal composition made by using the cyproconazole of formula (I) prepared by a process of the present disclosure may be applied in a range from about 10 g/ha to about 300 g/ha.

In an embodiment, a fungicidal composition made by using the cyproconazole of formula (I) prepared by a process of the present disclosure may be applied in a range from about 50 g/ha to about 200 g/ha.

In an embodiment, a fungicidal composition made by using the cyproconazole of formula (I) prepared by a process of the present disclosure may be applied in a range from about 100 g/ha to about 180 g/ha.

In an embodiment, a fungicidal composition made by using the cyproconazole of formula (I) prepared by a process of the present disclosure may be applied in a range of about 150 g/ha.

According to an embodiment of the present disclosure, the cyproconazole of formula (I) prepared by a process of the present disclosure is stable, over time and at various temperatures during the preparation process of the compound.

In another embodiment, the present disclosure provides a process for preparation of high purity cyproconazole of formula (I), substantially free from any undesired isomer(s).

In another embodiment, the process of the present disclosure avoids use of any column chromatography technique for purification of the obtained cyproconazole.

In another embodiment, the present disclosure provides an economical, simple and industrially viable process for preparation of high purity cyproconazole of formula (I).

In view of the above, it will be seen that the several advantages of the disclosure are achieved, and other advantageous results attained. Although the present disclosure has been disclosed in full, it will be understood that numerous additional modifications and variations could be made thereto without departing from the scope of the disclosure.

It will be understood that the specification and examples are illustrative but not limitative of the present disclosure and that other embodiments within the spirit and scope of the disclosure will suggest themselves to those skilled in the art. Other embodiments can be practiced that are also within the scope of the present disclosure. The following examples illustrate the disclosure, but by no means intend to limit the scope of the claims.

EXAMPLES

Methods
X-Ray Powder Diffraction (XPRD) Pattern
  Instrument: Bruker make 2$^{nd}$ generation D2 Phaser Powder X-Ray diffractometer;
  Operated at: 30.0 kV, 10 mA;
  Radiation: Cu-Kα;
  Wavelength: 1.54060° A,
  Scan Range: 2-40 2θ,
  Step size: 0.02°
High Performance Liquid Chromatography (HPLC):
  Column: Cosmosil 5 C18-MS-II [250 mm×4.6 IDX 5.0 µm]
  Mobile Phase: Water:Methanol:Acetonitrile [55:10:35]
  UV-Wavelength: 220 nm
  Flow Rate: 1.5 ml/minute
  Injection volume: 10.0 µl
  Column Temperature: 35° C.
  Run time: 45.0 minutes.

Example 1: Preparation of 2-(4-Chlorophenyl)-2-(1-Cyclopropylethyl) Oxirane i.e., Compound of Formula (III)

Premix solution A was prepared by adding of 95.04 g of dimethyl sulfate and 10.26 g of water in 91.95 g of dimethyl sulphide at a temperature range of about 25° C. to about 35° C. under stirring for a period of about 1 to about 2 hours.

Another solution B was prepared by stirring a mixture of 104.31 g of a ketone compound of formula (II) i.e., 1-(4-chlorophenyl)-2-cyclopropyl-1-propanone, 91.95 g of dimethyl sulphide and 90.95 g of potassium hydroxide at a temperature range of about 25° C.- to about 35° C. for a period of about 1 hour.

The premix solution A and the solution B were mixed to obtain a reaction mixture and this reaction mixture was then heated to a temperature range of about 40° C. to about 45° C. for a period of about 9 hours. After completion of the reaction, excess dimethyl sulphide was recovered to provide a reaction mass. To obtain reaction mass, 800 g of water, 68 g of sodium hypochlorite (8%) and 300 g of hexane were added, and this mixture was heated at a temperature range of about 40° C. to about 45° C. for a period of about 1 hour. The organic layer was then separated, and solvent was distilled off to obtain 109 g of the compound of formula (III). (Yield: 96.70%; Purity: 98.81%)

Example 2: Purification of Crude Cyproconazole to Obtain Cyproconazole of Formula (III)

A. Preparation of a Crude Cyproconazole

A mixture of 220 g of dimethylformamide, 40.60 g of 1,2,4-triazole and 100 g of toluene was prepared, and to this mixture was added 16.24 g potassium carbonate at a temperature range of about 65° C. to about 75° C., with stirring. The mixture was maintained for a period of about 1 hour and then moisture and toluene were azeotropically removed. The reaction mixture was heated at a temperature range of about 120° C. to about 125° C. and 104.84 g of the compound of formula (III) obtained in Example 1 along with 220 g of dimethylformamide was added within a period of about 1.5 to about 2 hours. Then the mixture was maintained for a period of about 2 hours at the same temperature. After completion of the reaction, dimethylformamide was distilled out under vacuum and then 1007 g of toluene and 296 g of water was added to the reaction mixture. The insoluble material was filtered out, an organic layer was separated, and the solvent was distilled off under vacuum. The mass obtained was treated with 450 g of hexane at a temperature range of about 20° C. to about 25° C. under stirring for a period of about 1 hour and then filtered to get 111 g of wet cake of crude cyproconazole.

The purity of wet cake of crude cyproconazole was analysed by HPLC method and the results obtained were:
  Cyproconazole: 97.07%
  Undesired Isomer: 2.68%
  Other impurities: 0.25%

B. Purification of the Crude Cyproconazole

To the wet cake of crude cyproconazole obtained in step A was added 166 g of methanol-water mixture, i.e., aqueous methanol (60:40), and then the mixture was heated to a temperature range from about 65° C. to about 70° C. to obtain a clear solution. The clear solution was then slowly cooled to a temperature of about 0° C. and the product obtained was isolated and dried to get 103 g of cyproconazole having a purity of 99.24%. (Yield: 73.9%)

The purity of cyproconazole was analysed by an HPLC method and results obtained were:
  Cyproconazole: 99.24%
  Undesired Isomer: 0.613%
  Other impurities: 0.15%
  Bulk density of cyproconazole obtained: 0.59 g/cc

Example 3: Preparation of the Cyproconazole of Formula (III)

A. Preparation of the Crude Cyproconazole

A mixture of 222 g of dimethylformamide, 40.94 g of 1,2,4-triazole and 100 g of toluene was prepared, to this mixture was added 16.37 g potassium carbonate at a temperature range from about 65° C. to about 75° C., with stirring. The mixture was maintained for a period of about 1 hour and then azeotropically moisture and toluene were removed. The reaction mixture was heated at a temperature range from about 120° C. to about 125° C. and 105.72 g of compound of formula (III) obtained in accordance with Example 1, along with 222 g of dimethylformamide was added within a period of about 1.5 hours. Then the mixture was maintained for a period of about 2 hours at the same temperature. After completion of the reaction, dimethylformamide was distilled out under vacuum and then 1007 g of toluene and 296 g of water was added to the reaction mixture. An organic layer was separated, and the solvent was distilled off under vacuum. The mass obtained was treated with 450 g of hexane at a temperature range from about 25° C. to about 35° C. under stirring for a period of 1 hour and was then filtered to provide 112 g of wet cake of the crude cyproconazole.

The purity of the wet cake of the crude cyproconazole was analysed by an HPLC method and the results obtained were:
  Cyproconazole: 97.47%
  Undesired Isomer: 2.319%
  Other impurities: 0.20%

B. Purification of the Crude Cyproconazole

To the wet cake of crude cyproconazole obtained in step A was added 170 g of methanol-water mixture, i.e., aqueous methanol (60:40), and then the mixture was heated to a temperature range from about 65° C. to about 70° C. to obtain a clear solution. The clear solution was then slowly cooled to a temperature of about 0° C. and the product obtain was isolated and dried to get 108 g of Cyproconazole having a purity of 99.47%. (Yield: 74.04%)

The purity of the cyproconazole of formula (III) was analysed by an HPLC method and the results obtained were:
Cyproconazole: 99.47%
Undesired Isomer: 0.41%
Other impurities: 0.12%
Bulk density of Cyproconazole obtained: 0.65 g/cc Example 4: Determination of Bio-Efficacy Two compositions of cyproconazole (10%) dry flowable (DF) formulations were compared to evaluate the bio-efficacy of the cyproconazole. The compositions were prepared by any standard method known to a person ordinarily skilled in the art. The compositions, Formulation A and Formulation B have been disclosed in detail.

In Formulation A, the cyproconazole has been prepared according to the process of Example 2. In Formulation B, the cyproconazole used in commercially available with approximately 96% HPLC purity. These formulations have been disclosed in Table 1.

TABLE 1

FORMULATIONS A AND B

| | | Quantity (% w/w) | |
|---|---|---|---|
| Sr. No. | Ingredients | Formulation A | Formulation B |
| 1 | Cyproconazole | 10.20 | 11.5 |
| 2 | Sodium salt of naphthalene sulfonate condensate | 10.0 | 10.0 |
| 3 | Sodium Lauryl Sulphate | 6.0 | 6.0 |
| 4 | Ammonium Sulfate | 15.0 | 15.0 |
| 5 | antifoam | 0.2 | 0.2 |
| 6 | Kaolin | Q.S. | Q.S. |
| | Total | | 100 |

Determination of Bio-Efficacy
Field Trials

A field trial was conducted on vine plot to evaluate the control of diseases i.e., powdery mildew on leaves with the composition for cyproconazole (10%) DF formulation, as a foliar application. The composition for cyproconazole (10%) DF formulation as prepared in Formulation A and B were diluted with water to the stated concentration of the active compound. The treatment details have been disclosed in Table 2.

TABLE 2

EXPERIMENTAL DETAILS FOR FIELD TRAIL

| Sr. No. | Parameters | Details |
|---|---|---|
| 1 | Crop | Grapes |
| 2 | Target Pest | Powdery Mildew |
| 4 | Water Quantity | 500 liters/ha |
| 5 | Dose (g a.i./ha) | 15 |
| 6 | No. of applications | Two at 7 Days interval |
| 7 | Observations Interval | 7 Days after first and second application |
| 8 | Plot size | 5 vines per plot |
| 9 | Method of application | Foliar |
| 10 | Spray Equipment | Battery operated sprayer |
| 11 | Nozzle | Hollow cone |

The experiment was laid out in a randomized block design (RBD). The plot size was of 5 vines per plot. Applications were made with a battery-operated sprayer and hollow cone nozzle. The rate of application was 500 L/ha for all the trials. The various fungicidal compositions, as disclosed in Table 2, were sprayed on vine plots to evaluate the control of powdery mildew. Based on the doses, a weighed quantity of test products were dissolved in water and sprayed uniformly twice at an interval of 7 days. The percentage disease incidence (PDI) per plot was assessed 7 days post-application (DAA) after each application. Mean of percentage disease index (PDI) after two applications were recorded has been disclosed in Table 3.

TABLE 3

RESULTS FOR PDI AND % REDUCTION OVER CONTROL

| Sr. No. | Treatments | Dose g/ha | PDI | | % Disease Reduction over control | |
|---|---|---|---|---|---|---|
| | | | 7 DAA (I) | 14 DAA (II) | 7 DAA (I) | 14 DAA (II) |
| Co | Untreated control | — | 11.3 | 18 | — | — |
| T1 | Formulation A | 150 | 7 | 8.3 | 38.1 | 53.9 |
| T2 | Formulation B | 150 | 9.8 | 10 | 13.3 | 44.4 |

T = Treatment no.;
Co = Control;
PDI: Mean of percentage Disease Index;
First Application: (I);
Second Application: (II);
DAA = Days After Application Mean of Percentage Disease Index (PDI) was calculated using following formula:

$$PDI = \frac{\text{Sum of all disease Ratings}}{\text{Total } no \text{ of leaves/bunches assessed} \times \text{Maximum Disease grade}} \times 100$$

Observations

Table 3 discloses that treatment T1 provides better efficacy than treatment T2. T1 provides up to 53.9% of disease reduction over control. From the results it is clear that the efficacy of formulation A prepared by using the cyproconazole according to the present disclosure is shows better efficacy and activity as compared to the commercially available product.

The invention claimed is:

1. A process for preparing high purity cyproconazole of formula (I),

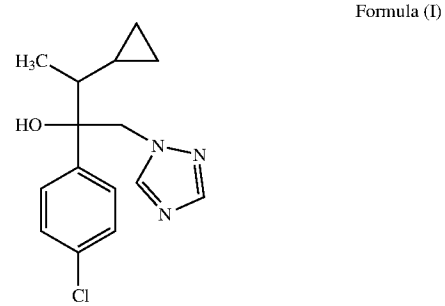 [SMILES: CC(C1CC1)C(O)(Cn1cncn1)c1ccc(Cl)cc1]

Formula (I)

the process, free of column chromatography, comprising:

a) reacting a ketone of formula (II) with a sulfonium salt in the presence of a base to obtain a compound of formula (III);

Formula (II)

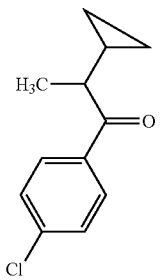

Formula (III)

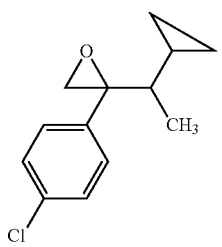

wherein the sulfonium salt is obtained by reacting dimethyl sulfide and dimethyl sulfate in the presence of water;

b) reacting the compound of formula (III) with 1,2,4-triazole or its alkali metal salt to obtain a crude cyproconazole; and c) treating the crude cyproconazole with an aqueous alcohol to obtain the high purity cyproconazole.

2. The process as claimed in claim 1, wherein reacting the compound of formula (III) in step b) is the alkali metal salt of 1,2,4-triazole.

3. The process as claimed in claim 1, wherein said alkali metal salt of 1,2,4-triazole is prepared in situ, by reacting the 1,2,4-triazole with an alkali metal base.

4. The process as claimed in claim 3, wherein said alkali metal base is selected from the group consisting of alkali metal hydroxides, carbonates and bicarbonates.

5. The process as claimed in claim 1, wherein the aqueous alcohol comprises methanol and water, and wherein the weight ratio of water to alcohol in the aqueous alcohol is in a range from about 10:90 to about 90:10.

6. The process for preparing a compound of formula (III) of claim 1, wherein the high purity cyproconazole has a purity greater than 98%.

7. The process as claimed in claim 6, wherein said base is an organic base or an inorganic base.

8. The process as claimed in claim 6, wherein said base comprises sodium hydroxide, potassium hydroxide, sodium carbonate, sodium bicarbonate, potassium carbonate, or potassium bicarbonate.

9. The process as claimed in claim 6, wherein said sulfonium salt is prepared in situ by reacting the dimethyl sulfide, dimethyl sulfate and water.

10. The process of claim 6, wherein
reacting the ketone of formula (II) with the sulfonium salt in the presence of the base and dimethyl sulfide is at a temperature from 35° C. to 60° C.; and
wherein the sulfonium salt is obtained by reacting the dimethyl sulfide and dimethyl sulfate in the presence of water at a temperature from 20° C. to 40° C.

* * * * *